US012610216B2

(12) United States Patent (10) Patent No.: US 12,610,216 B2
Lee et al. (45) Date of Patent: Apr. 21, 2026

(54) METHOD AND DEVICE FOR MEASURING POSITION BASED ON SOFTV2X

(71) Applicant: LG ELECTRONICS INC., Seoul (KR)

(72) Inventors: Songgun Lee, Seoul (KR); Hakseong Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 396 days.

(21) Appl. No.: 18/203,314

(22) Filed: May 30, 2023

(65) Prior Publication Data

US 2024/0406685 A1    Dec. 5, 2024

(51) Int. Cl.
*H04W 4/12* (2009.01)
*H04W 64/00* (2009.01)

(52) U.S. Cl.
CPC ........... *H04W 4/12* (2013.01); *H04W 64/003* (2013.01); *H04W 64/006* (2013.01)

(58) Field of Classification Search
CPC ....... H04W 4/023; H04W 4/12; H04W 64/00; H04W 64/003; H04W 64/006
See application file for complete search history.

(56) References Cited

U.S. PATENT DOCUMENTS

| | | | |
|---|---|---|---|
| 12,241,988 B2 * | 3/2025 | Baek ...................... | G01S 5/0205 |
| 12,352,879 B1 * | 7/2025 | Padaki ...................... | G01S 3/46 |

| | | | |
|---|---|---|---|
| 2021/0055370 A1 * | 2/2021 | Tolentino ................... | G01S 5/14 |
| 2022/0070612 A1 * | 3/2022 | Henry ................... | H04B 1/7163 |
| 2022/0268875 A1 * | 8/2022 | Szebenyei ............... | H04W 4/33 |
| 2023/0083657 A1 * | 3/2023 | Wang ....................... | A61B 6/54 |
| | | | 382/128 |
| 2023/0182729 A1 * | 6/2023 | Bandi ................... | G06F 18/214 |
| 2023/0367330 A1 * | 11/2023 | Morinaga ............ | G05D 1/0268 |
| 2024/0045019 A1 * | 2/2024 | Shin ........................... | G01S 5/14 |
| 2024/0080366 A1 * | 3/2024 | Edwards ............... | H04L 67/131 |

FOREIGN PATENT DOCUMENTS

| | | |
|---|---|---|
| CN | 113691934 A | 11/2021 |
| EP | 4 137 835 A1 | 2/2023 |
| KR | 10-2021-0069691 A | 6/2021 |
| WO | WO 2014/080402 A1 | 5/2014 |
| WO | WO 2022/082144 A2 | 4/2022 |

* cited by examiner

*Primary Examiner* — Jeong S Park

(74) *Attorney, Agent, or Firm* — Birch, Stewart, Kolasch & Birch, LLP

(57) ABSTRACT

A first user equipment (UE) including a transmitter configured to transmit a first safety message including a first Ultra-WideBand (UWB) token ID of the first UE for connecting to an UWB session; a receiver configured to receive a second safety message transmitted by a second UE in an anchor mode, the second safety message including a second UWB token ID of the second UE for connecting to the UWB session; and a controller configured to set the first UE into a tag mode, initiate the Ultra-WideBand (UWB) session with the second UE having the second UWB token ID, perform Time of Flight (ToF) or angle of arrival (AoA)-based measurement based on the second UE in the anchor mode, and update a location of the first UE based on the ToF or AoA-based measurement.

18 Claims, 20 Drawing Sheets

: First subscription area

: Second subscription area

| | | |
|---|---|---|
| | Application | —— Safety Application |
| | Classification | —— Algorithm |
| | Message | ------ Message |
| X.509 | MQTT | —— Geocast |
| | TLS 1.2 | —— Confidentiality |
| | TCP / IP | |
| | Cellular Modem | |

Figure 20:
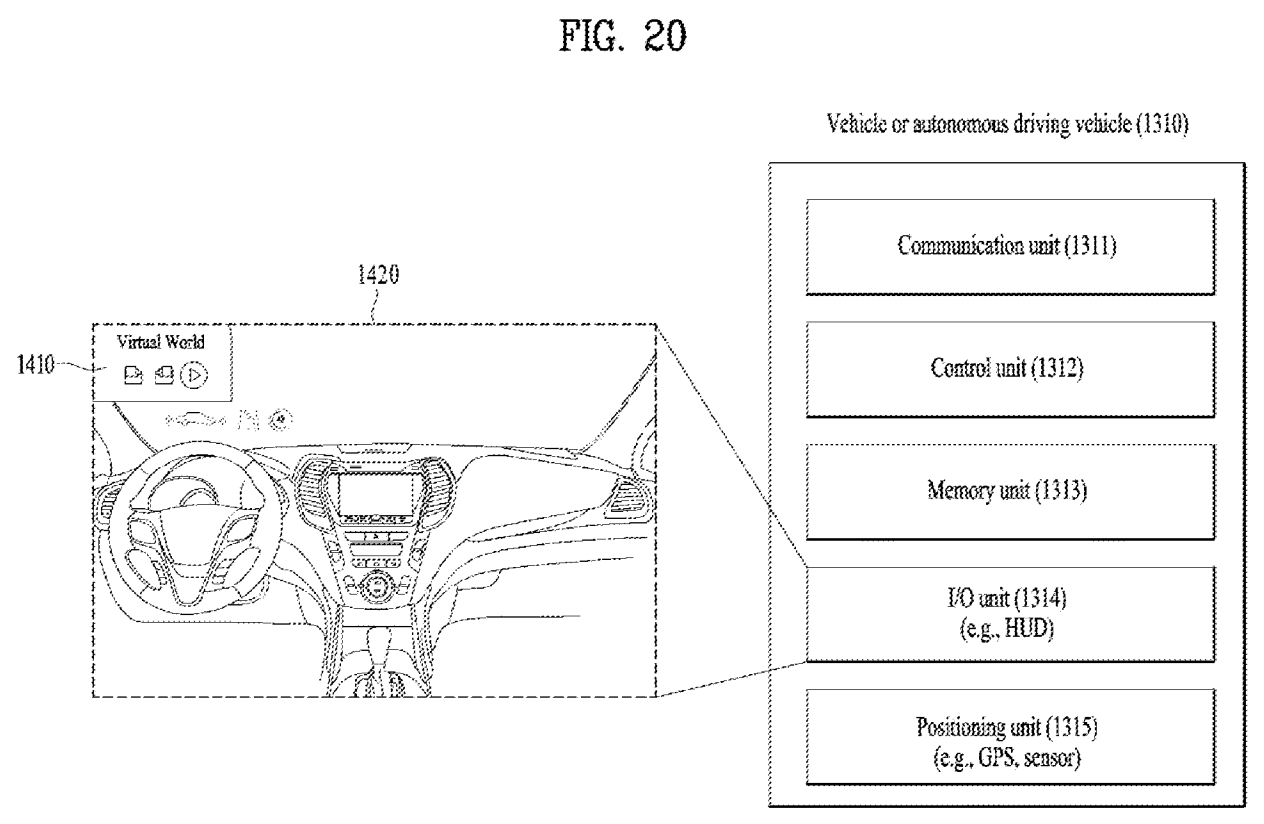

Vehicle or autonomous driving vehicle (1310)

Communication unit (1311)

Control unit (1312)

Memory unit (1313)

I/O unit (1314) (e.g., HUD)

Positioning unit (1315) (e.g., GPS, sensor)

1420

1410

Virtual World

METHOD AND DEVICE FOR MEASURING POSITION BASED ON SOFTV2X

BACKGROUND

Technical Field

The present disclosure relates to a wireless communication system, and more particularly to an operating method and device of a user equipment (UE) related to position measurement based on an Ultra-WideBand (UWB) in soft vehicle-to-everything (V2X).

Discussion of the Related Art

Wireless communication systems provide various types of communication services such as voice and data. In general, a wireless communication system is a multiple access system capable of supporting communication with multiple users by sharing available system resources (bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system, and a multi carrier frequency division multiple access (MC-FDMA) system.

Sidelink (SL) refers to a communication scheme in which a direct link is established between user equipments (UEs) and the UEs directly exchange voice or data without intervention of a base station (BS). SL is considered as a solution of relieving the BS of the constraint of rapidly growing data traffic.

Vehicle-to-everything (V2X) is a communication technology in which a vehicle exchanges information with another vehicle, a pedestrian, and infrastructure by wired/wireless communication. V2X can be categorized into four types: vehicle-to-vehicle (V2V), vehicle-to-infrastructure (V2I), vehicle-to-network (V2N), and vehicle-to-pedestrian (V2P). V2X communication can be provided via a PC5 interface and/or a Uu interface.

As more communication devices demand larger communication capacities, there is a need for enhanced mobile broadband communication relative to existing Radio Access Technologies (RATs). Accordingly, a communication system is under discussion, for which services or UEs sensitive to reliability and latency are considered. The next-generation RAT in which eMBB, MTC, and URLLC are considered is referred to as new RAT or NR. In NR, V2X communication is also be supported.

SUMMARY

An object of the present disclosure is to provide more accurate measurement of a position of a UE based on a UWB and an SSR delegator in SoftV2X.

According to an embodiment, a first UE of a SoftV2X related tag mode in a wireless communication system includes a transmitter configured to transmit a first Personal Safety Message (PSM) or a first Basic Safety Message (BSM), a receiver configured to receive a second PSM or a second BSM transmitted by a second UE in an anchor mode, and a controller configured to initiate an Ultra-WideBand (UWB) session with the second UE and perform Time of Flight (ToF) or angle of arrival (AoA)-based measurement based on the second UE in the anchor mode, wherein the first PSM, the second PSM, the first BSM, and the second BSM include a UWB Token ID of a UE transmitting a message, and the first UE in the tag mode initiates the UWB session with the second UE found based on the UWB Token ID.

According to another embodiment, an operating method of a first UE of a SoftV2X related tag mode in a wireless communication system includes transmitting a first PSM or a first BSM, receiving a second PSM or a second BSM transmitted by a second UE in an anchor mode, and initiating an UWB session with the second UE and performing ToF or AoA-based measurement based on the second UE in the anchor mode, wherein the first PSM, the second PSM, the first BSM, and the second BSM include a UWB Token ID of a UE transmitting a message, and the first UE in the tag mode initiates the UWB session with the second UE found based on the UWB Token ID.

The second UE can calculate final location information from UWB-based measurement and GNSS-based measurement. The final location information can be determined through Loosely coupled integration based on a Kalman filter from UWB-based measurement and GNSS-based measurement. The final location information can be determined by integrating a UWB measurement value when calculating a position using a GNSS measurement value. The first PSM, the second PSM, the first BSM, and the second BSM can be related to a UWB discovery procedure.

The UWB Token ID can be included in SupplementalExtensions of the first BSM and the second BSM. The second UE in the anchor mode can receive SSR correction information from a State Space Representation (SSR) delegator. The SSR delegator can broadcast SSR correction information, which is changed when SSR correction information is changed, to all UEs in each grid.

The first UE in the tag mode can maintain the tag mode if positioning accuracy is greater than a preset value, and determine whether to maintain the UWB session by evaluating a degree of risk with a remote UE if the positioning accuracy is less than the preset value. The first UE in the tag mode can switch to an anchor mode if there is no risk of collision with the remote UE.

The second UE in the anchor mode can maintain the anchor mode if positioning accuracy is less than a preset value, and determine whether to maintain the UWB session by evaluating a degree of risk with a remote UE if the positioning accuracy is greater than the preset value. The second UE in the anchor mode can switch to a tag mode if there is no risk of collision with the remote UE.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure.

FIG. 2 is a diagram showing an example of a quadtree used tile.

US 12,610,216 B2

3

FIGS. 17 to 20 are diagrams illustrating various devices to which embodiment(s) are applicable.

DETAILED DESCRIPTION

In various embodiments of the present disclosure, "/" and "," should be interpreted as "and/or." For example, "A/B" can mean "A and/or B." Further, "A, B" can mean "A and/or B." Further, "A/B/C" can mean "at least one of A, B and/or C." Further, "A, B, C" can mean "at least one of A, B and/or C." In various embodiments of the present disclosure, "or" should be interpreted as "and/or." For example, "A or B" can include "only A", "only B", and/or "both A and B." In other words, "or" should be interpreted as "additionally or alternatively."

Figure 1:
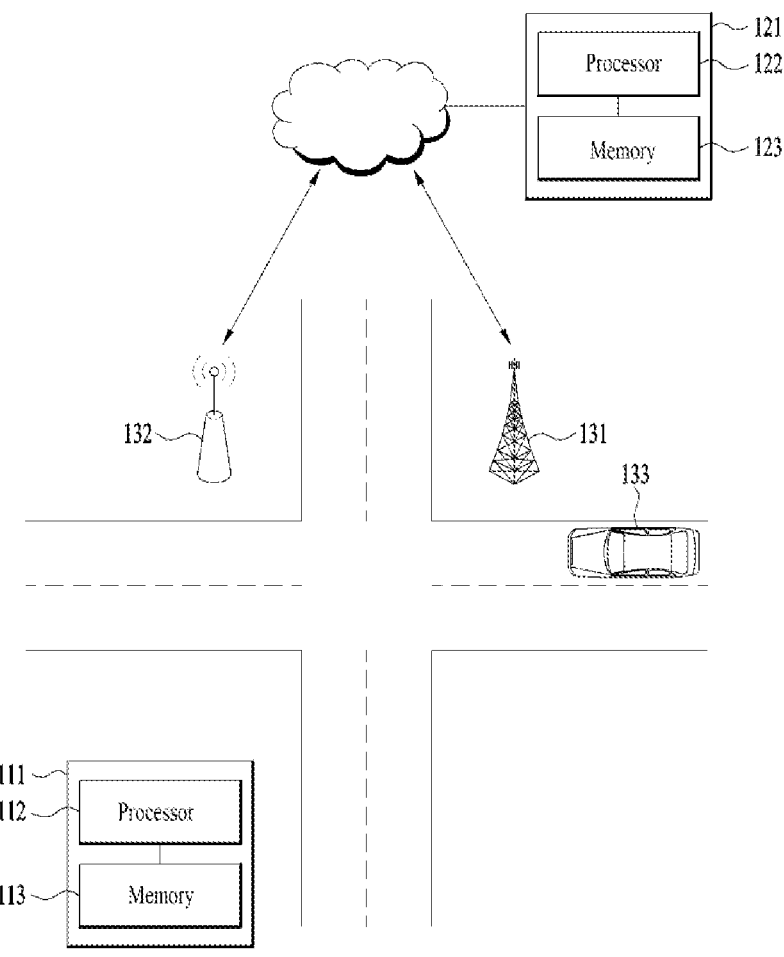
FIG. 1 is a diagram showing a system having the present disclosure applied thereto.

FIG. 1 is a diagram showing a system having the present disclosure applied thereto. The system includes a UE 111 (or a V2X equipment/device) and a server 121 (or a V2X server). The UE 111 can communicate with the server 121 through a base station 131 or a Road Side Unit (RSU) 132. The UE 111 can communicate with the base station 131, the Road Side Unit (RSU) 132, a neighbor vehicle 133, and/or a neighbor UE using a wireless communication protocol. There is no limit to wireless communication protocols, including, for example, Dedicated Short Range Communications (DSRC), Cellular-V2X (C-V2X), WiFi, Bluetooth, and/or 3$^{rd}$ Generation Partnership Project (3GPP) based Cellular Communication Protocol (e.g., Wideband Code Division Multiple Access (WCDMA), Long Term Evolution (LTE), New Radio (NR), etc.).

The server 121 receives one or more V2X messages from the UE 111 in a managed area. The server 121 can forward the one or more collected V2X messages to the UE 111 currently in subscribing.

The V2X message is periodically or aperiodically transmitted by the UE 111 (or RSU 132) to the server 121 and provides state information of the UE 111 (or a device managed by the RSU 132). For example, the UE 111 can transmit 10 V2X messages per second. The server 121 collects V2X messages from a multitude of UEs and forwards the V2X messages to the subscribing UE.

The following table shows an example of information elements included in the V2X message. Not all information elements are essential, and the name is just an example. Information elements can be added/changed/deleted depending on the policy or situation.

4

A V2X message transmitted by the UE 111 to the server 121 is referred to as an Uplink (UL) V2X message, and a V2X message transmitted by the server 121 to the UE 111 is referred to as a Downlink (DL) V2X message. The UE 111 can include a processor 112 and a memory 113. The processor 112 implements the function of the UE 111 and can include one or more software modules. The UE 111 can further include various additional devices according to functions such as a display, a user interface, a wireless modem, etc.

The server 121 includes computing hardware connected to the one or more base stations 131 and/or the RSU 132 to provide V2X functions and services to UE 111. The server 121 can be a Mobile/multi-access Edge Computing (MEC)-based server or a centralized server. The server 121 can be referred to as another name such as a geocast server, a soft server, etc. The server 121 can include a processor 122 and a memory 123. The processor 122 implements a function of the server 121 and can include one or more software modules.

The processor 112/122 can include Application-Specific Integrated Circuit (ASIC), Central Processing Unit (CPU), Application Processor (AP), Digital Signal Processors (DSPs), Digital Signal Processing Devices (DSPDs), Programmable Logic Devices (PLDs), Field Programmable Gate Arrays (FPGAs), microcontroller, chipset, logic circuit, data processor, and/or combinations thereof. In a software implementation for the following embodiments, software codes for performing the functions described herein can be stored in the memory 113/123 and processed by the processor 112/122.

The memory 113/123 can store information accessible by the processor 112/122. The information can include instructions executable by the processor 112/122 and/or data processed by the processor. The memory 113/123 can include some form of computer-readable medium that operates to store information. For example, the memory 113/123 can include Read Only Memory (ROM), Random Access Memory (RAM), Digital Video Disc (DVD), optical disc, flash memory, Solid State Drive (SSD), hard drive, and combinations thereof.

Message Queuing Telemetry Transport (MQTT) is used as a message protocol between the UE 111 and the server 121, but this is only an example. Advanced Message Queu-

TABLE 1

| Name | Description |
|---|---|
| V2X ID | Temporary Identifier (ID) for identifying UE that transmits this message. This can be randomly selected by UE and periodically changed. The size can be 4 octets. |
| Position | Indicates the location of UE. This can include Latitude, Longitude, and Elevation. |
| (Positional Accuracy | Includes quality of various parameters used to model the accuracy of positioning. |
| Velocity | Indicates the speed of UE. |
| Heading | Indicates the current heading (direction of motion) of UE. |
| Path History | Defines a geometric path reflecting UE's movement over some period of time and/or distance |
| Acceleration | Indicates acceleration of UE. This can include a set of acceleration values for three orthogonal directions of UE: longitude axis, lateral axis, and vertical axis. |
| Device type | Indicates the type of UE. Examples: Pedestrians, vehicles, bicycles, etc. |
| Publishing area | Area where the UE sends V2X messages to the server. Publishing area includes one or more tiles at each level. | ing Protocol (AMQP), HyperText Transfer Protocol (HTTP), and/or vendor specific protocols can be used.

Now, the setting of an area for a V2X service will be described in more detail. Hereinafter, a tile refers to a geographical basic unit for setting a subscription area. Hereinafter, a quadrangle is shown as a tile shape, which is just exemplary. There are no restrictions on the shapes of tiles such as polygons, circles, etc.

Figure 2:
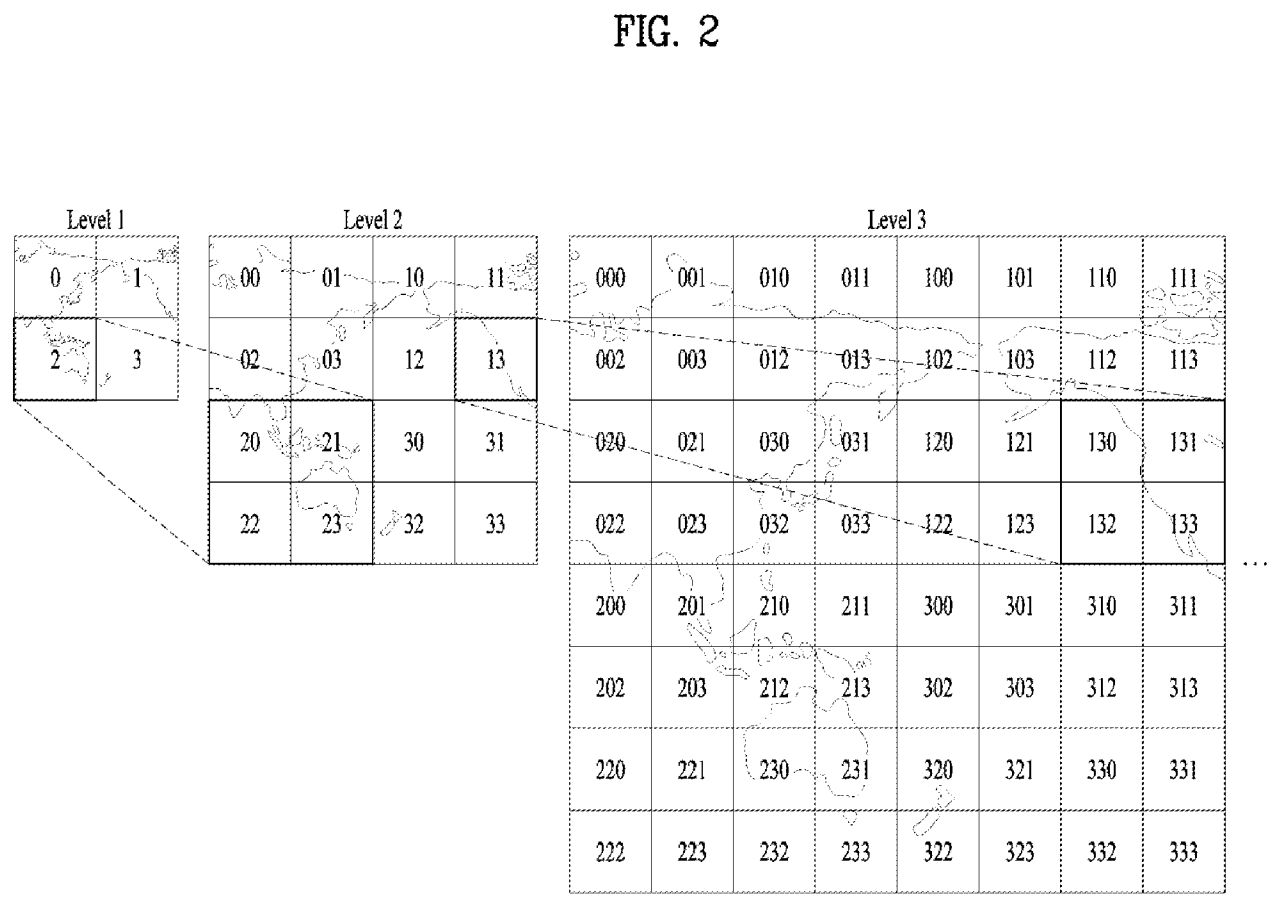

FIG. 2 is a diagram showing an example of a quadtree used tile. The quadtree represents a partition of space in two dimensions by decomposing a map (i.e. world map) into four equal quadrants, subquadrants, and so on. A size of the quadrant varies according to a zoom level, and each quadrant corresponds to a tile. Here, the cases where the levels are 1, 2, and 3 are shown. The larger the level, the smaller the size of the tile. At each level, a unique identifier is assigned to a tile. A tile ID can have the bit number corresponding to a level.

A UE can obtain an ID of a tile in which the UE is located based on its location information (e.g., latitude and longitude). The UE and/or server can adjust a size of an area by adjusting a level according to a situation.

In the following embodiment, areas for a V2X service are as follows.

Management area: An area managed by a server when one or more servers distributively manage an area to serve large-scale users or a large area. The management area includes one or more tiles.

Subscription area: An area where a UE has subscribed to a server. The subscription area can be referred to by other names such as a concerned area, an impact area, a geocast area, etc. The subscription area includes one or more tiles. The subscription area can be included in one management area, or can be defined over a plurality of management areas by a plurality of servers.

Publishing area: An area where a UE transmits a V2X message to a server. The publishing area can include one or more tiles at each level. The publishing area can indicate a tile in which the UE is currently located. A part or all of the publishing area can overlap the subscription area.

Figure 3:
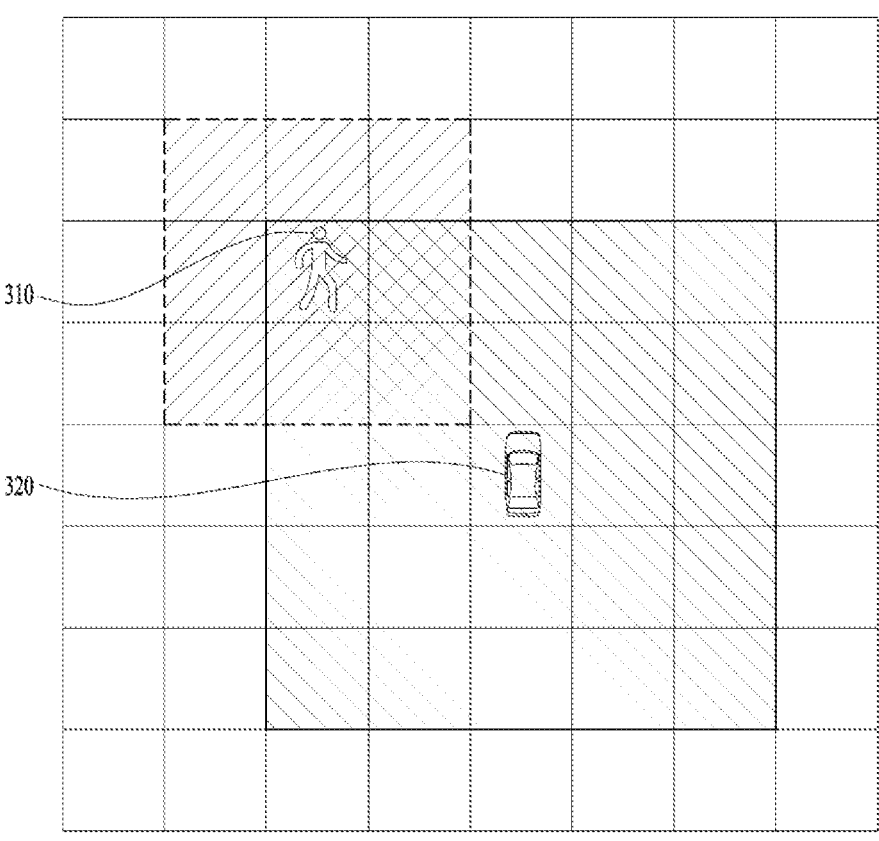
FIG. 3 shows one example of setting a subscription area.
Figure 3:
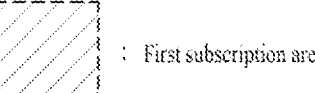
Figure 3:
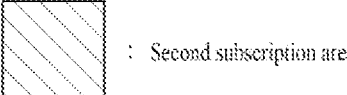

Next, FIG. 3 shows one example of setting a subscription area. A first subscription area is set for a first UE 310, and a second subscription area is set for a second UE 320. Each of the UEs can periodically or aperiodically set/change/delete the subscription area (e.g., when its location is changed). Each of the UEs can request the server to set/change/delete the subscription area.

The number of tiles included in the first subscription area is 9, and the number of tiles included in the second subscription area is 25, but there is no limit to the number of tiles included in the subscription area or the shape of the subscription area. The subscription area can include a tile in which the UE is located. Alternatively, the subscription area can include one or more tiles except for the tils in which the UE is located.

The first UE 310 can generate a first V2X message and periodically transmit the first V2X message to a server. The second UE 320 can generate a second V2X message and periodically transmit the second V2X message to the server. The server can forward one or more V2X messages received in or around the subscription area to the UE associated with the subscription area.

A device for setting a subscription area can be referred to as a 'subscriber device.' Also, a device for transmitting a V2X message to a server can be referred to as a 'publisher device.' A UE can be a subscriber device, a provider device, or both a subscriber device and a provider device. The server can forward V2X messages transmitted by provider devices in a management area to the subscriber device.

The server can deliver a V2X message of the provider device 'associated' with a subscription area of the subscriber device to the subscriber device. The provider device associated with the subscription area of the subscriber device can be referred to as a 'subscribed provider device.' The provider device associated with the subscription area of the subscriber device can satisfy at least one of the following conditions (i) to (iii). (i) Some or all of the publishing area of the provider device overlaps the subscription area of the subscriber device. (ii) Some or all of the subscription area of the provider device overlap the subscription area of the subscriber device. (iii) A location where the provider device transmits the V2X message is within the subscription area of the subscriber device.

According to the condition (i) or (iii), the server delivers a V2X message received within the first subscription area to the first UE 310. The server delivers a V2X message received in the second subscription area to the second UE 320.

Since the first UE 310 is located in the second subscription area, the server can forward the first V2X message to the second UE 320. The second UE 320 is a subscriber device, and the first UE 310 becomes a subscribed provider device.

Since the second UE 320 is not located in the first subscription area (which means that the condition (i) or the condition (iii) is not satisfied), the server does not forward the second V2X message to the first UE 310. The second UE 320 is not a provider device of the first UE 310. If the condition (ii) is considered, the second UE 320 can be a provider device of the first UE 310.

Figure 4:
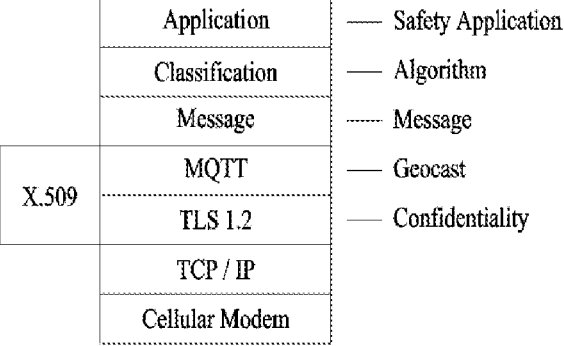
FIG. 4 is a diagram showing a SoftV2X protocol stack.

Next, FIG. 4 is a diagram showing a SoftV2X protocol stack operable in a UE, a smartphone, etc. Each layer of the SoftV2X protocol stack will be described with reference to FIG. 4. Here, SoftV2X is one V2X communication method in which a method described below is used, and the following description is not limited to the term SoftV2X. In addition, other terms referring to a communication method corresponding to the following description can also be considered as corresponding to SoftV2X in the present disclosure.

Cellular Modem is a modem that uses cellular networks. A cellular network is a communication network configured and operated by dividing an area into several cells, where a cell means a divided area including a single base station. Cellular network communication technology can include 5G New RAT (NR), Long Term Evolution (LTE), and the like. In SoftV2X, unicast communication is performed unlike in the case of V2X. In SoftV2X protocol, a network/transport layer uses IP/TCP used for cellular networks.

Transport Layer Security (TLS) layer is intended to ensure confidentiality using transport layer security, and an authentication certificate uses X.509, a Public Key-based (PKI) ITU-T standard. In addition, SoftV2X protocol is configured to perform the geocast function of sending messages only to users in a specific area. To this end, Message Queuing Telemetry Transport (MQTT), which is an issue-subscription-based messaging protocol, is used.

Subsequently, SoftV2X uses the message defined in SAE J2735 (BSM, PSM, RSA, etc.). SAE J2735 defines signal specifications such as messages, data frames, element formats, structures and the like for V2V/V2I communication, and the main messages are shown in Table 2 below.

TABLE 2

| Main Messages | Use range | Contents |
|---|---|---|
| Basic Safety Message (BSM) | V2V | Provides overall safety-related information. Broadcasting communications with periodicity of 100 ms |
| PVD (Probe Vehicle Data) | V2I | Delivers Probe data' collected on a vehicle to RSU |
| MapData | I2V | Provides information on intersections and road topographic data |
| SPaT (SinglePhaseAndTiming) | I2V | Used in conjunction with MapData to provide information on signal phase and time synchronization of movement at the intersection |
| RTCMCorrections (Real-Time Differential Correction Maritime) | I2V | Message to provide RTCM correction information |
| PSM (PersonalSafetyMessage) | V2P | Provides information about pedestrians in danger range |
| PDM (ProveDataManagement) | I2V | Message for managing PVD messages |
| RSA (RoadSideAlert) | V2X | Supports generation of ad-hoc message from public safety vehicle and RSU |
| SSM (SignalStatusMessage) | I2V | Used for response to Facility Operational Status Request |
| SRM (SignalRequestMessage) | V2I | Message for vehicle entering intersection to obtain service information from signal controller. |
| TIM (TravelerInformationMessage) | I2V | Message that convey information on various traffic information, unexpected situations, pre-road work, etc. |
| CSR (CommonSafetyRequest) | V2V | Request message for data support for safety information exchange |
| EVA (EmergencyVehicleAlert) | V2X | Deliver information about emergency vehicle |
| ICA (IntersectionVehicleAlert) | V2X | Deliver information about vehicle hazard conditions near intersections |
| NMEACorrections | I2V | Used for transmitting message of initial GPS data format on DSRC channel |
| testMessages00-15 | N/A | Used in customized message format for each use region |
| Not Assigned | N/A | Assigned when adding new message content |

Subsequently, a classification layer performs an algorithm to generate data necessary for risk determination. An application layer determines whether or not it is dangerous based on the data that raised Classification, thereby informing pedestrians and drivers carrying smartphones.

Figure 5:
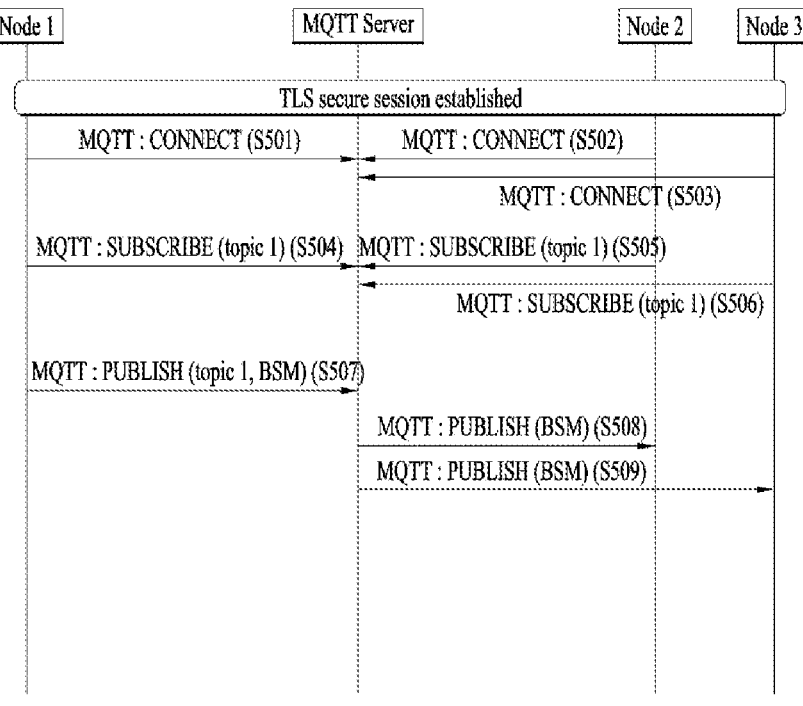
FIG. 5 is a flowchart showing an example of performing geocast using MQTT in SoftV2X.

FIG. 5 is a flowchart showing an example of performing geocast using MQTT in SoftV2X. In Legacy V2X, devices in the same region can naturally receive messages (such as BSM, etc.) through a broadcast channel. However, since cellular networks use unicast communication, SoftV2X uses MQTT to perform unicast transmission to all devices in the same region, resulting in broadcast-like effects.

For MQTT communication, a secure session must first be set up between all nodes and a server using TLS. Each node can first perform a CONNECT process and then perform a SUBSCRIBE process on a specific topic (S501 to S503 of FIG. 5). In this instance, a topic is selected differently depending on a region. A map can be divided by a tile, and the same topic value can be given to each tile. Therefore, each of the nodes performs SUBSCRIBE by selecting a topic according to a tile in which the corresponding node is located. For example, in FIG. 5, Nodes 1, 2, and 3 were all present in the same tile (region and subscribed to the same topic 1 (S504 to 506 in FIG. 5).

When the Node1 transmits PUBLISH (BSM) to the MQTT server (S507), the server delivers the PUBLISH (BSM) in a unicast manner to all nodes having subscribed to the topic1 (S508, S509). Each of the Node 2 and the Node 3 performs Classification and Threat Assessment based on the received BSM message. If detecting danger, the corresponding node informs smartphone users (e.g., pedestrian and driver) of the detection of the danger. A car or vehicle transmits BSM and a pedestrian transmits PSM, and these messages basically contain information (e.g., ID, location, speed, acceleration, direction, etc.) necessary for danger detection.

Further, in a network (device to network) based V2X service, user equipments can access a cellular network and receive a V2X service from a cloud server. In addition, in a UE-to-UE direct communication (device to device) based V2X service, a UE (OBU) can receive a V2X service by communicating with other neighbor UEs or a Road Side Unit (RSU).

State-Space Representation (SSR)

Figure 6:
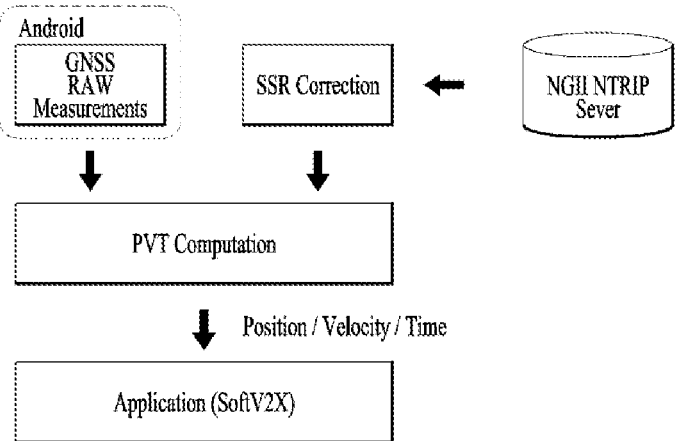
FIGS. 6 to 16 are diagrams to describe embodiment(s)

In a process in which a signal transmitted from a satellite reaches a receiver, a satellite signal includes an error element that degrades positioning accuracy for various reasons. A positioning error element can be removed or compensated for through correction information or a correction method such as error modeling, and this process may be the most important process in performing GNSS-based precise positioning. In more detail, error elements of GNSS positioning are as illustrated in FIG. 6. There are a total of five positioning error elements of a satellite orbit error, a satellite clock error, a satellite signal bias error, an ionospheric error, and a tropospheric error.

In general, satellite observation equations are defined as Equations 1 and 2 for observed values of code and carrier phase. The meaning of parameters included in each equation are included in Table 2, a subscript r in the equation means a receiver, and a superscript s means a satellite.

$$p_r^s = R + c(\delta t_r - \delta t^s) + \delta I + \delta T + \delta B + \delta M + \epsilon \qquad \text{(Equation 1)}$$

$$\Phi_r^s = R + c(\delta t_r - \delta t^s) + \lambda N - \delta I + \delta T + \delta B + \delta M + \epsilon \qquad \text{(Equation 2)}$$

TABLE 2

| | |
|---|---|
| $\rho_r^s$ | Code pseudo distance |
| $\Phi_r^s$ | Carrier phase observed value |
| R | Geometric distance between satellite and receiver |
| $\delta t_r$ | Receiver clock error |
| $\delta t_s$ | Satellite clock error |
| c | Speed of light |
| $\delta I$ | Ionospheric error |
| $\delta T$ | Tropospheric error |
| $\delta B$ | Satellite bias error |
| $\delta M$ | Multipath error |
| N | Ambiguous integer |
| $\lambda$ | Wavelength |
| $\epsilon$ | Noise |

An Android smartphone provides GNSS observation data (pseudo-range, carrier phase, etc.) required for location calculation to an application. The National Geospatial Information Service provides SSR correction information through the Internet. A smartphone application can calculate a position with high accuracy using GNSS observation data and SSR correction information.

Ultra-WideBand (UWB)

An UWB system refers to a wireless communication system using a bandwidth of 500 MHz or more or a system in which a fractional bandwidth (bandwidth divided by a center frequency) is 20% or more. In 2019, as iPhone 11 by Apple is equipped with a UWB chip, the system has been used more to provide a service that utilizes positioning rather than wireless communication. Currently, chip manufacturers Qorvo and NXP have sold chips with UWB positioning functions, and have launched smartphones formed by equipping a UWB function on Apple and Samsung smartphones.

The UWB measures a distance using a time consumed for UWB radio waves to travel between two points. When an anchor is placed at a standard place and a tag is attached to a moving object whose distance to the anchor is to be measured, the tag transmits radio waves and the anchor receives the radio waves, resulting in a time difference occurs, because radio waves take time to travel between the tag and the anchor. This is called a Time of Flight (ToF).

Figure 7:
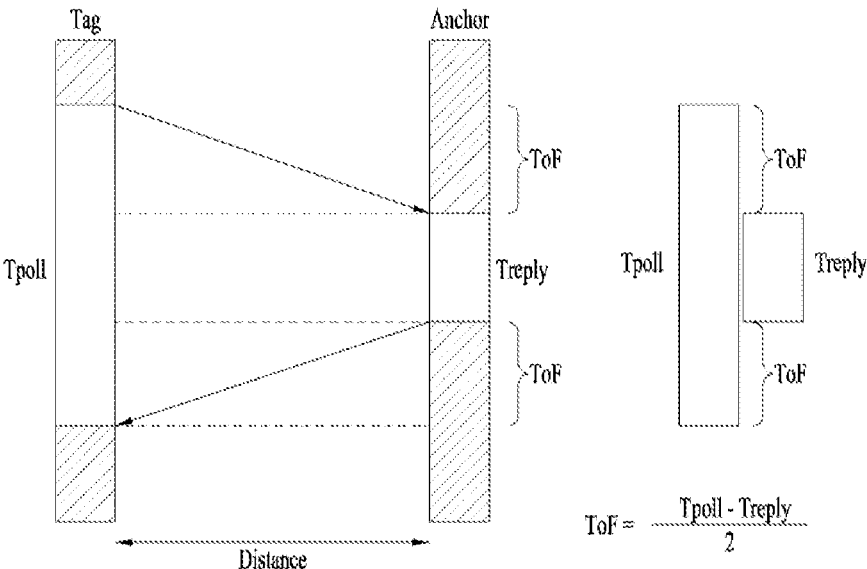

In more detail, FIG. 7 shows a method of obtaining ToF between two points. Referring to FIG. 7, if the tag polls radio waves (meaning that the tag periodically sends signals) and the anchor responds thereto after receiving the polling radio waves, Treply, which is a time difference between receiving a signal and responding thereto, can be subtracted from Tpoll, which is a time difference until the tag transmits radio waves and receives a response, to obtain two ToF times, and a value corresponding to the two ToFs can be divided by 2 to calculate ToF.

Figure 8:
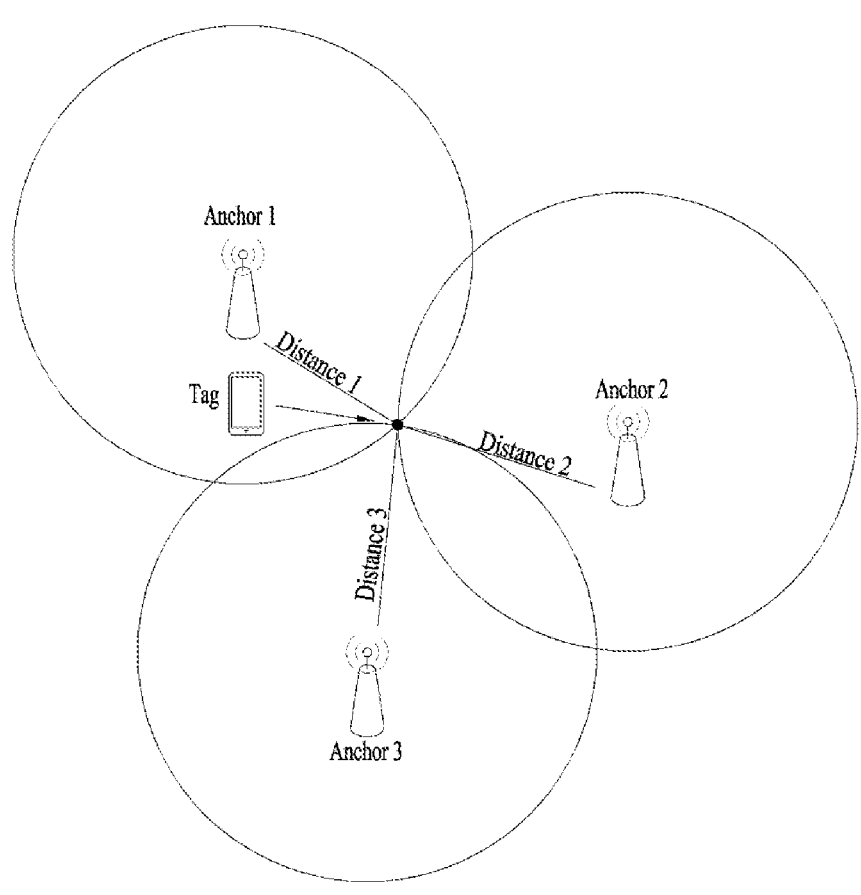
Figure 9:
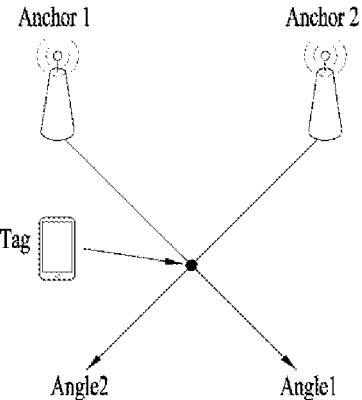

In addition to ToF, a value used for positioning in a UWB is an angle of arrival (AoA). Through AoA, a direction between the anchor and the tag can be measured. If a fixed anchor is used, an absolute position of a smartphone can be known using a TdoA method as shown in FIG. 8. When anchors have pre-known absolute coordinates, if a distance to each of the three anchors is known, absolute coordinates of a tag device (smartphone) can be calculated by a measurement method, as shown in FIG. 9.

Figure 10:
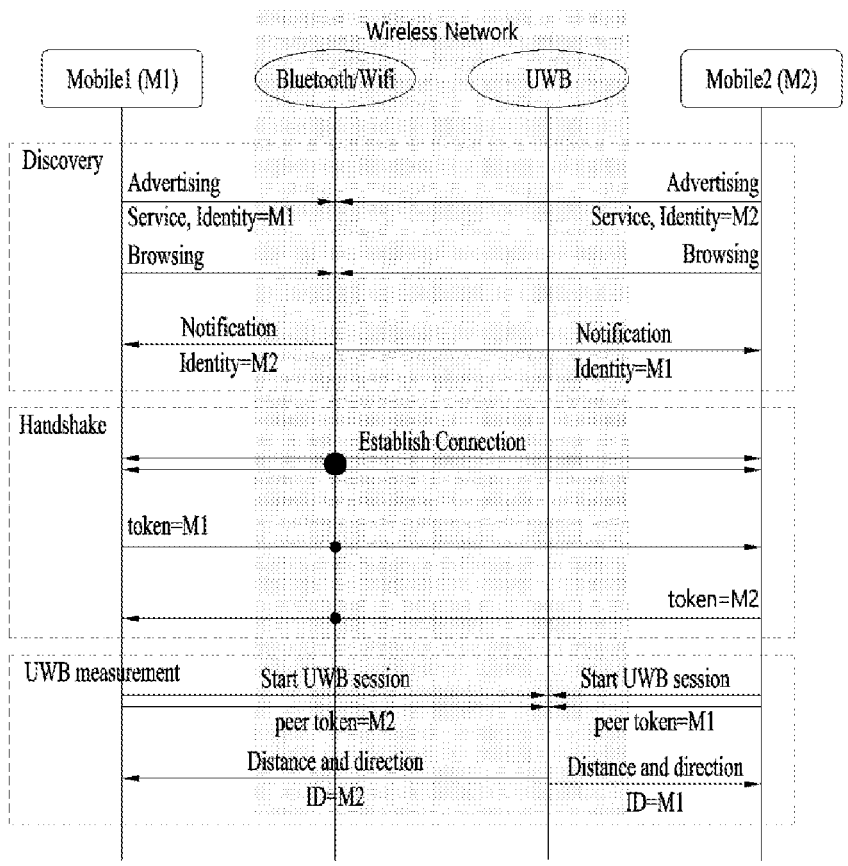

Next, FIG. 10 illustrates a procedure for UEs to initiate a UWB session to measure a location based on a UWB. A process of measuring a UWB to know a relative position between smartphones is largely divided into three steps.

1) Discovery: A nearby UWB device is discovered.
2) Handshake: A token used for a UWB session is exchanged.
3) UWB measurement: A session is started using a token of the other party and a distance and direction of the other party are measured.

The positioning accuracy of a smartphone is up to 3 m, which is insufficient for applications that require high positioning accuracy, such as SoftV2X. The positioning accuracy of the smartphone can be improved using the SSR correction information, but a GNSS phase observed value (carrier phase) inside a UE is required to calculate the location using the SSR correction information. However, a phase observed value is provided only for the latest Premium Android Phone and not for iPhone, and thus is not capable of being universally applied to all smartphones. SSR correction information is information broadcast regardless of the location of a UE, and includes correction information in all regions, and accordingly, a message size of the information is large.

In UWB technology, the more anchors are installed, the higher the positioning accuracy. However, unlike indoors, it is difficult to install many anchors in an outdoor environment, and therefore it is difficult to ensure high positioning accuracy. Prior to UWB location measurement, discovery and handshake processes need to be performed, which causes power consumption due to Wi-Fi/BT and delay until location measurement.

Therefore, hereinafter, a method and device for measuring a position of a UE based on SoftV2X while resolving problems in that it is difficult to apply conventional measurement methods to the UE are described.

A first UE in a tag mode according to an embodiment includes a transmitter configured to transmit a first personal safety message (PSM) or a first basic safety message (BSM), a receiver configured to receive a second PSM or a second BSM transmitted by a second UE in an anchor mode, and a controller configured to initiate a UWB session with the second UE and perform ToF or AoA based measurement based on the second UE in the anchor mode.

Figure 11:
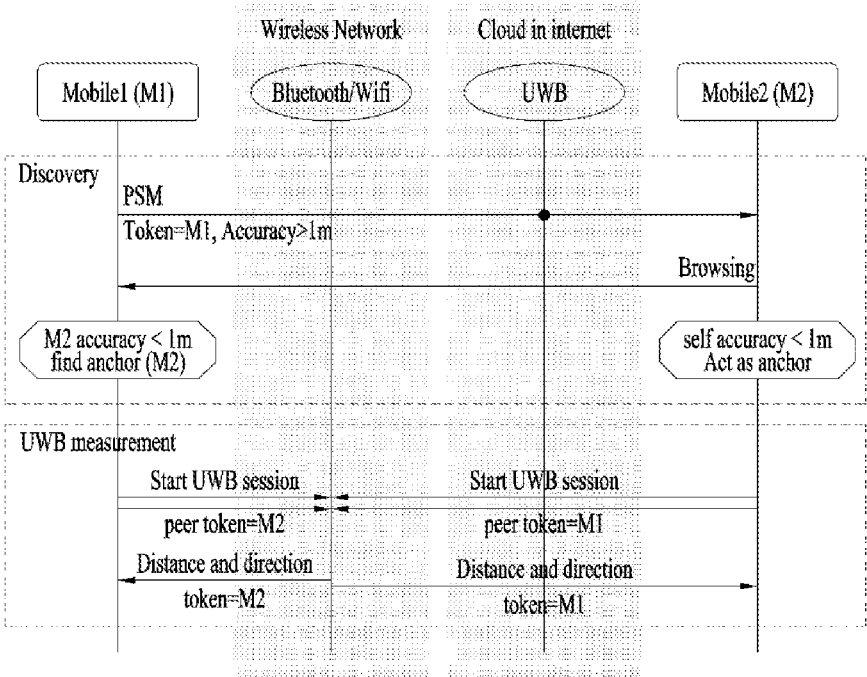

The first PSM, the second PSM, the first BSM, and the second BSM include a UWB token ID of a UE transmitting a message, and the first UE in the tag mode can initiate a UWB with the second UE found based on the UWB token ID, as illustrated in FIG. 11. The first PSM, the second PSM, the first BSM, and the second BSM can be related to a UWB discovery procedure. In other words, by including the UWB token ID in the PSM/BSM, the discovery and handshake processes, which are prior processes of UWB measurement, are performed based on SoftV2X. SoftV2X can transmit the BSM/PSM to neighboring UEs every second, and determine proximity through location information when receiving a message.

In FIG. 11, Mobile1 operates in a pedestrian mode to transmit a PSM, and Mobile2 operates in a vehicle mode to transmit a BSM. In the flowchart above, the positioning accuracy of a pedestrian UE is greater than 1 m, and thus operates in a tag mode, and the positioning accuracy of a vehicle UE is less than 1 m, and thus operates in an anchor mode. The pedestrian UE can obtain distance and direction information from the anchor through UWB measurement and use the information to improve positioning accuracy thereof.

The UWB Token ID can be included in SupplementalExtensions of the first BSM and the second BSM. In this instance, a BSM message can be as shown in Table 3 below.

The UWB Token ID of each UE can be included in RegionalExtension of all V2X messages. In this instance, a message frame can include message ID, message content (content according to message ID), and RegionalExtension.—UWB token can be included in RegionalExtension.

The second UE can calculate a final location information from the UWB-based measurement and the GNSS-based measurement. For example, the final location information can be determined through Kalman filter-based loosely

TABLE 3

```
SupplementalVehicleExtensions ::= SEQUENCE {
-- Note that VehicleEventFlags, ExteriorLights,
-- PathHistory, and PathPrediction are in VehicleSafetyExtensions
-- Vehicle Type Classification Data
classification BasicVehicleClass OPTIONAL,
-- May be required to be present for non passenger vehicles
classDetails VehicleClassification OPTIONAL,
vehicleData VehicleData OPTIONAL,
-- Various V2V Probe Data
weatherReport WeatherReport OPTIONAL,
weatherProbe WeatherProbe OPTIONAL,
-- Detected Obstacle data
obstacle ObstacleDetection OPTIONAL,
-- Disabled Vehicle Report
status DisabledVehicle OPTIONAL,
-- Oncoming lane speed reporting
speedProfile SpeedProfile OPTIONAL,
-- Raw GNSS measurements
theRTCM RTCMPackage OPTIONAL,
-- UWB session for UWB positioning
uwbId INTEGER OPTIONAL
uwbToken UwbToken OPTIONAL
regional SEQUENCE (SIZE(1..4)) OF
RegionalExtension {{REGION.Reg-SupplementalVehicleExtensions}} OPTIONAL,
}
UwbToken ::= OCTET STRING
```

The PSM can be as shown in Table 4 below.

TABLE 4

```
PersonalSafetyMessage ::= SEQUENCE {
basicType PersonalDeviceUserType,
secMark DSecond,
msgCnt MsgCount,
id TemporaryID,
position Position3D, -- Lat, Long, Elevation
accuracy PositionalAccuracy,
speed Velocity,
heading Heading,
accelSet AccelerationSet4Way OPTIONAL,
pathHistory PathHistory OPTIONAL,
pathPrediction PathPrediction OPTIONAL,
propulsion PropelledInformation OPTIONAL,
useState PersonalDeviceUsageState OPTIONAL,
crossRequest PersonalCrossingRequest OPTIONAL,
crossState PersonalCrossingInProgress OPTIONAL,
clusterSize NumberOfParticipantsInCluster OPTIONAL,
clusterRadius PersonalClusterRadius OPTIONAL,
eventResponderType PublicSafetyEventResponderWorkerType OPTIONAL,
activityType PublicSafetyAndRoadWorkerActivity OPTIONAL,
activitySubType PublicSafetyDirectingTrafficSubType OPTIONAL,
assistType PersonalAssistive OPTIONAL,
sizing UserSizeAndBehaviour OPTIONAL,
attachment Attachment OPTIONAL,
attachmentRadius AttachmentRadius OPTIONAL,
animalType AnimalType OPTIONAL,
uwbId INTEGER OPTIONAL,
uwbToken UwbToken OPTIONAL,
regional SEQUENCE (SIZE(1..4)) OF
RegionalExtension {{REGION.Reg-PersonalSafetyMessage}} OPTIONAL,
...
}
``` coupled integration of the UWB-based measurement and the GNSS-based measurement. Alternatively, the final location information can also be determined by integrating a UWB measurement value when a location is calculated using a GNSS measurement value.

In more detail, a UE periodically (1 second) receives BSM/PSM messages from all neighboring UEs. When a message is received, a session is created between UEs within a short distance. At this time, a mode (anchor/tag) of a counterpart UE needs to be different. The UE in the tag mode calculates more accurate integrated location information by combining the GNSS and UWB measurement values. When the UWB measurement value is used, a list of a location of each anchor and a distance to the anchor can be obtained.

If the location of the anchor is in the BSM/PSM message, a distance to the anchor can be obtained immediately from a TDoA measurement value, but in the case of an AoA measurement value, the location of a tag can be obtained first by AoA location survey, and then the distance can be obtained using the locations of the tag and anchor.

There are two ways to combine a GNSS measurement value and a UWB measurement value:

1) Loosely coupled integration: When there is only location information of a device and no distance measurement value to a satellite (combining location result values measured in a UWB and a satellite)

Figure 12:
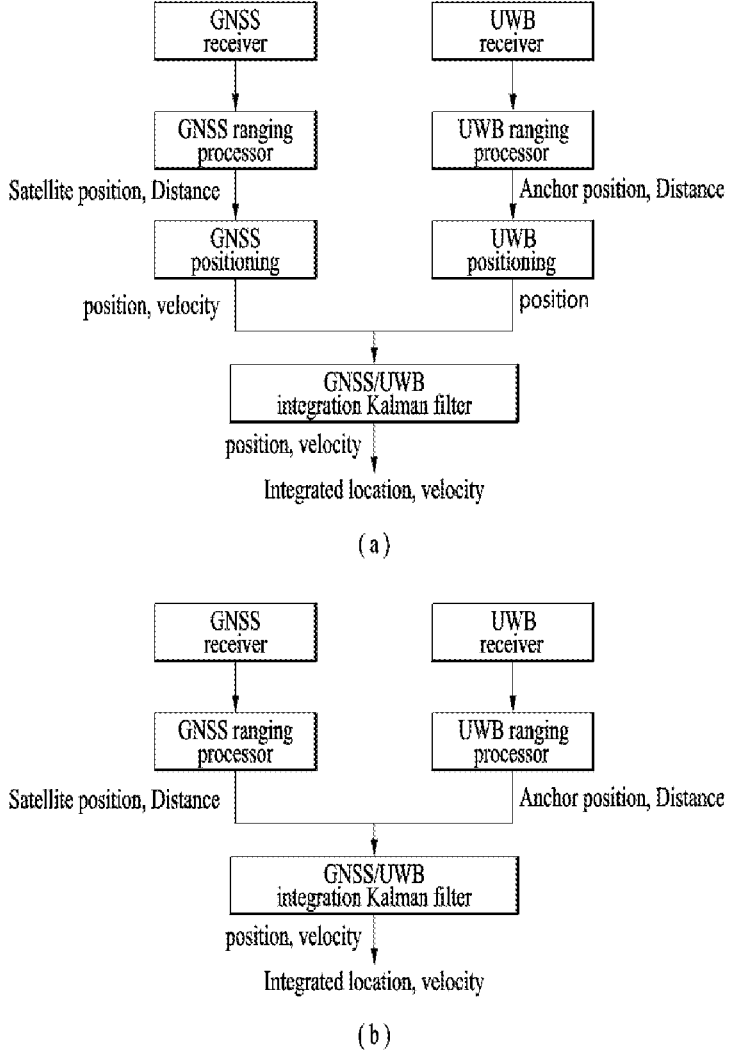

2) Tightly coupled integration: When there is a distance measurement value to a satellite First, the loosely coupled integration is a method of integrating a position based on a GNSS measurement value and a position based on a UWB measurement value by using a Kalman filter and is shown in FIG. 12(a). The tightly coupled integration is a method of calculating a position by integrating the UWB measurement value when calculating a position using the GNSS measurement value and is shown in FIG. 12(b). The tightly coupled integration shows higher performance than the loosely coupled integration.

A basic integration concept of the Kalman filter is based on reliability. Based on the reliability (Sigma of error) of the GNSS and the UWB, integration can be performed based on a position with high reliability. A GNSS location and a UWB location are obtained independently, and the two pieces of information are integrated through the Kalman filter. A system of the Kalman filter is designed as follows.

State vector: x, y, z in Earth-Centered Earth-Fixed (ECEF) coordinate system

Measurement: GNSS position, velocity

Kalman prediction (or propagation): UWB position

Measurement matrix: Since units of a state and measurement are the same, no conversion process is required and the unit matrix is used.

The location and distance of the satellite and UWB anchor location and distance information are input to the Kalman filter.

State vector: x, y, z of ECEF coordinate system, Rx timer, and signal bias

Measurement: distance from satellite or anchor

A UE calculates a position thereof every second. Depending on positioning accuracy, an anchor mode and a tag mode can be determined, and when a mode change occurs, the existing UWB session is stopped.

The first UE in the tag mode can maintain the tag mode if the positioning accuracy is greater than a preset value, and determine whether to maintain the UWB session by evaluating a degree of risk with a remote UE if the positioning accuracy is less than the preset value. The first UE in the tag mode can switch to the anchor mode if there is no risk of collision with the remote UE.

Figure 13:
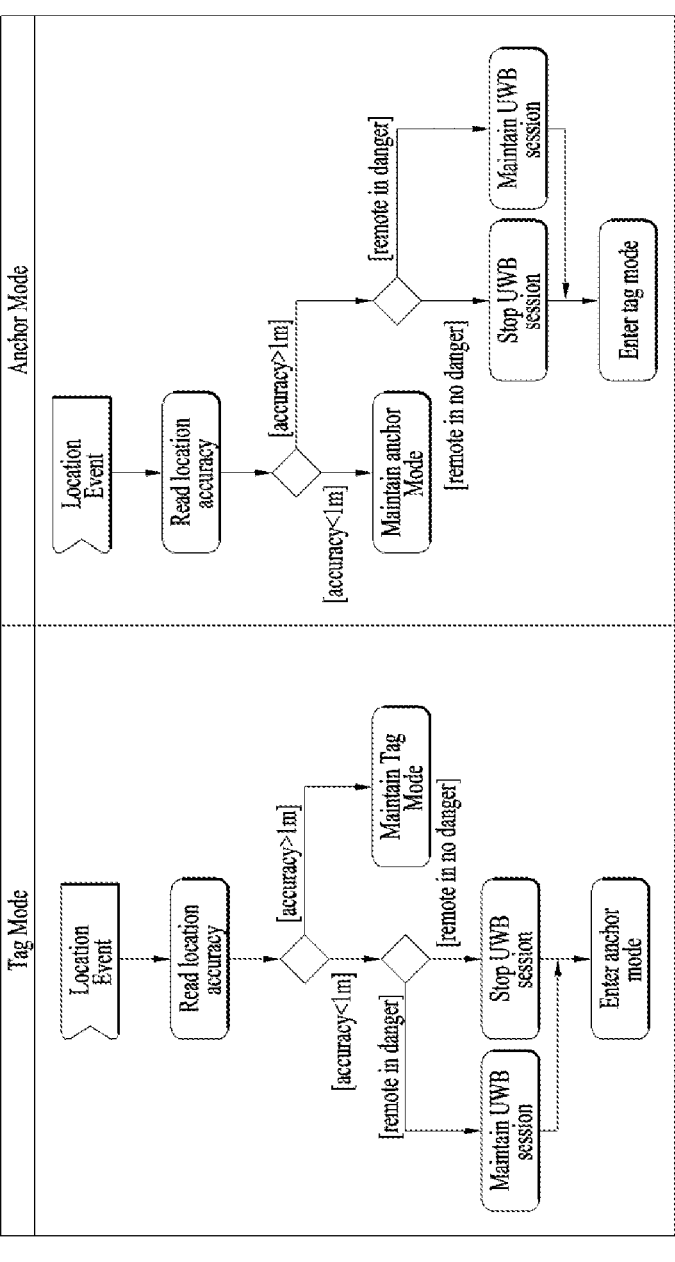

In addition, the second UE in the anchor mode can maintain the anchor mode if the positioning accuracy is less than a preset value, and determine whether to maintain the UWB session by evaluating a degree of risk with a remote UE if the positioning accuracy is greater than the preset value. The second UE in the anchor mode can switch to the tag mode if there is no risk of collision with the remote UE. The mode switch is shown in FIG. 13.

Figure 14:
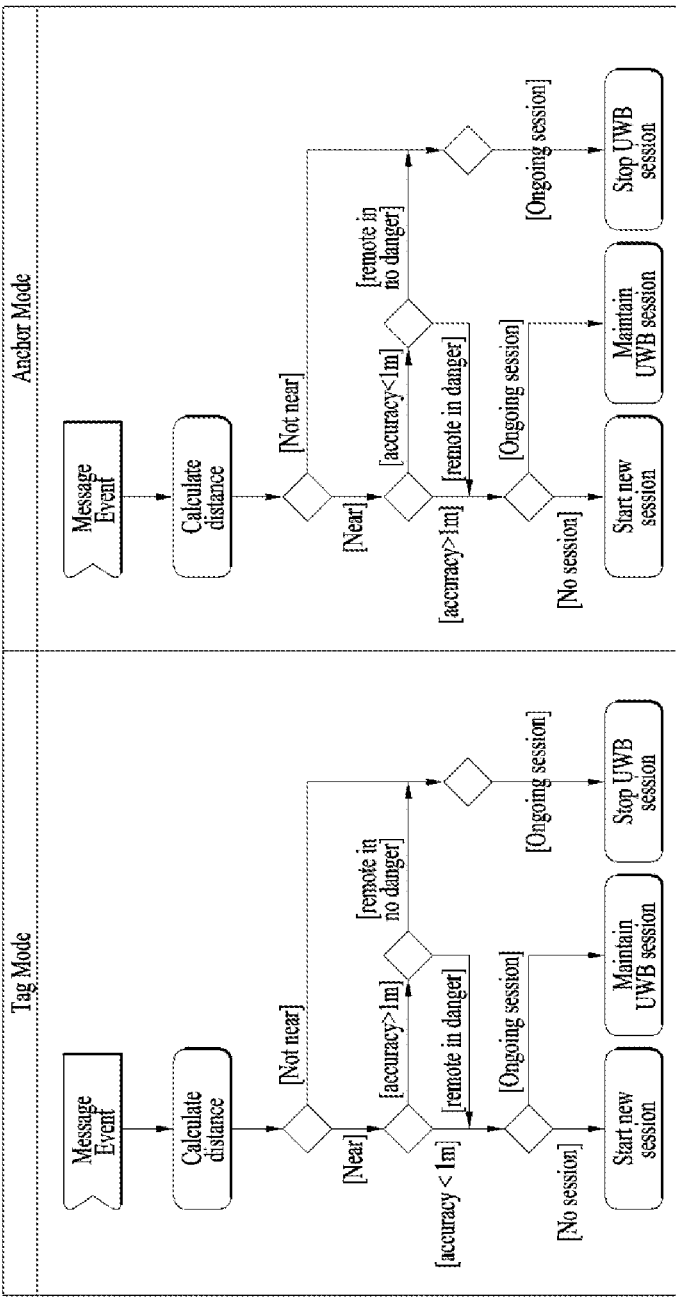
Figure 15:
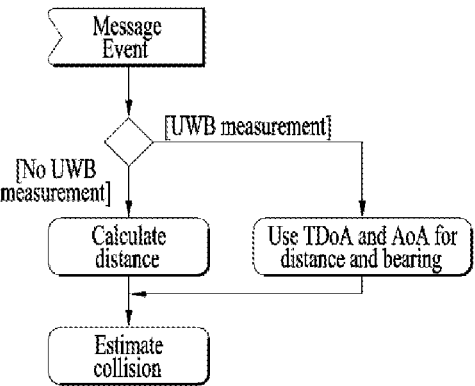

FIG. 14 illustrates a procedure for maintaining, establishing, or stopping a UWB session according to a distance to another UE. In FIGS. 13 and 14, if a remote-in-danger condition is satisfied, a UWB measured value can be directly used in a collision algorithm between two devices as well as a location calculation. A UWB session is established between UEs in a collision-probable area regardless of a positioning accuracy or a mode (anchor or tag), and is maintained even if the mode is changed. For collision prediction, a distance to a counterpart UE and a bearing of the counterpart UE are used. This information can be calculated using absolute coordinates of the two UEs, and TDoA and AoA measured values of a UWB are directly used. FIG. 15 illustrates a distance and bearing process for collision estimation.

In relation to the above description, an operating method of a first UE in a SoftV2X related tag mode can include transmitting a first PSM or a first BSM, receiving a second PSM or a second BSM transmitted by a second UE in an anchor mode, initiating an UWB session with the second UE, and performing ToF or AoA-based measurement based on the second UE in the anchor mode. The first PSM, the second PSM, the first BSM, and the second BSM can include a UWB token ID of a UE transmitting a message, and the first UE in the tag mode can initiate the UWB session with the second UE found based on the UWB token ID.

As described above, the positioning accuracy of the UE can be improved by using a UWB. As an SSR UE acts as an anchor, UWB positioning can be used without an anchor infrastructure. In addition, as SoftV2X replaces a discovery and handshake process required for UWB positioning, UWB positioning can be managed more elaborately. Through GNSS and UWB fusion, positioning accuracy can be improved even with a small number of anchors.

The second UE in the anchor mode can receive SSR correction information from an SSR delegator. When the SSR correction information is changed, the SSR delegator can broadcast the changed SSR correction information to all UEs in each grid. Conventional SSR correction information is calculated based on a grid point and transmitted at regular intervals (30 seconds), and each SSR correction message includes correction information for all grid points. In the present disclosure, by placing an SSR delegator between an NGII SSR server and a smartphone, only SSR correction information for a grid point including the location of the UE is transmitted, and SSR correction is not transmitted periodically, but only when the information changes, the SSR correction is transmitted, and thus the amount of information can be reduced. In addition, by applying the polling method, the position can be quickly calculated by using the SSR information in a short time at the beginning.

Figure 16:
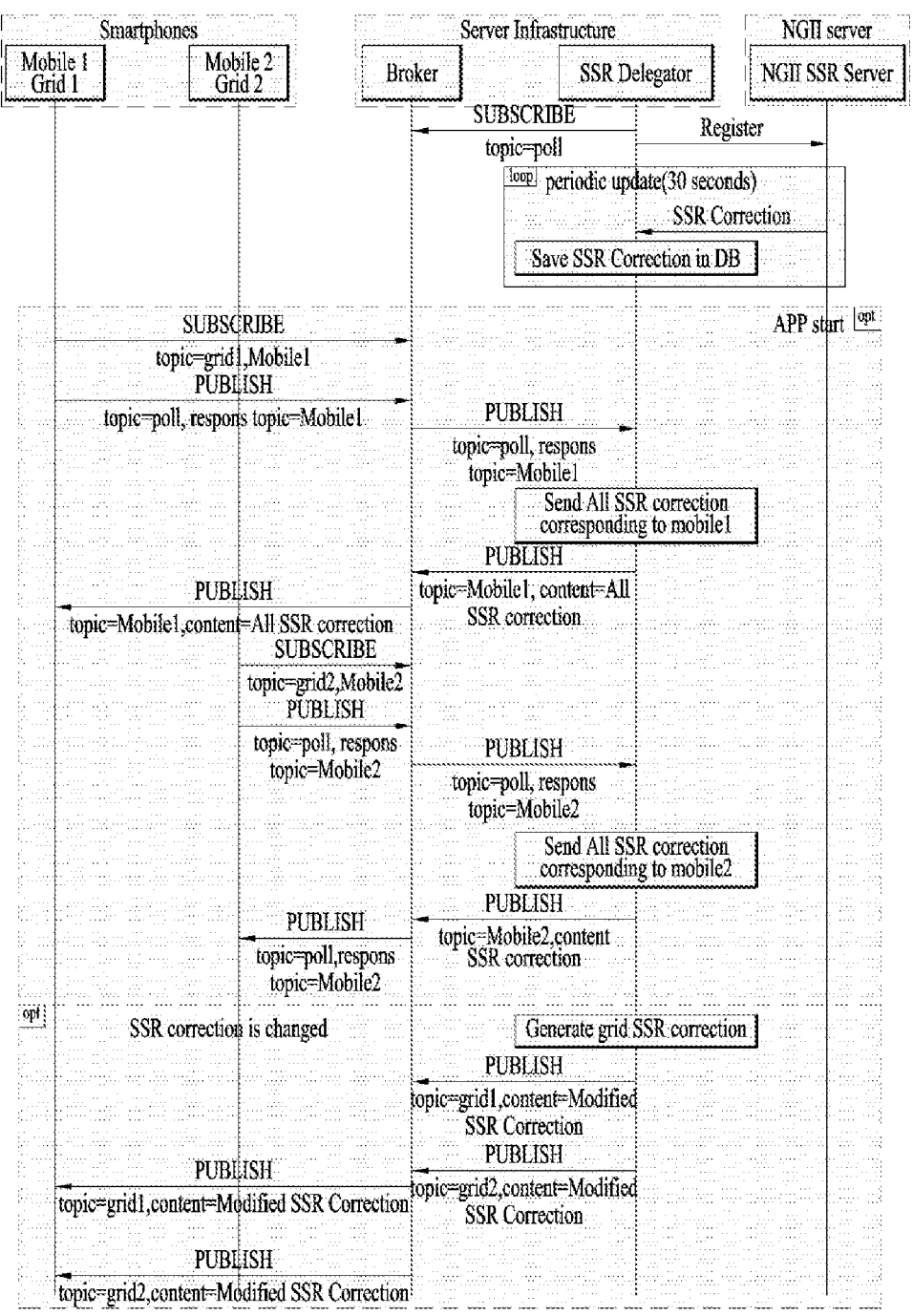

Next, FIG. 16 shows an SSR delegator flow chart. The SSR delegator periodically receives correction information from the NGII SSR server and stores the correction information in a DB. A mobile device requests the SSR delegator to transmit all SSR correction information when an application starts, and the delegator transmits all SSR correction information corresponding to the location of the mobile device. At this time, the correction can be transmitted only to a specific UE by mutually using a response topic.

When the SSR correction information is changed, the SSR delegator transmits the changed SSR correction information to all UEs in each grid in a broadcast method. Since each grid has a unique topic ID, SSR correction information suitable for each grid can be created and transmitted.

By applying the SSR delegator in this way, data usage and power consumption of the UE can be reduced by reducing the amount of SSR correction information transmitted to the UE. In addition, by receiving all the SSR correction information when an application starts, the position can be calculated by applying the SSR information in a short time.

Examples of Communication Systems Applicable to the Present Disclosure

The various descriptions, functions, procedures, proposals, methods, and/or operational flowcharts of the present disclosure described in this document can be applied to, without being limited to, a variety of fields requiring wireless communication/connection (e.g., 5G) between devices.

Hereinafter, a description will be given in more detail with reference to the drawings. In the following drawings/description, the same reference symbols can denote the same or corresponding hardware blocks, software blocks, or functional blocks unless described otherwise.

Figure 17:
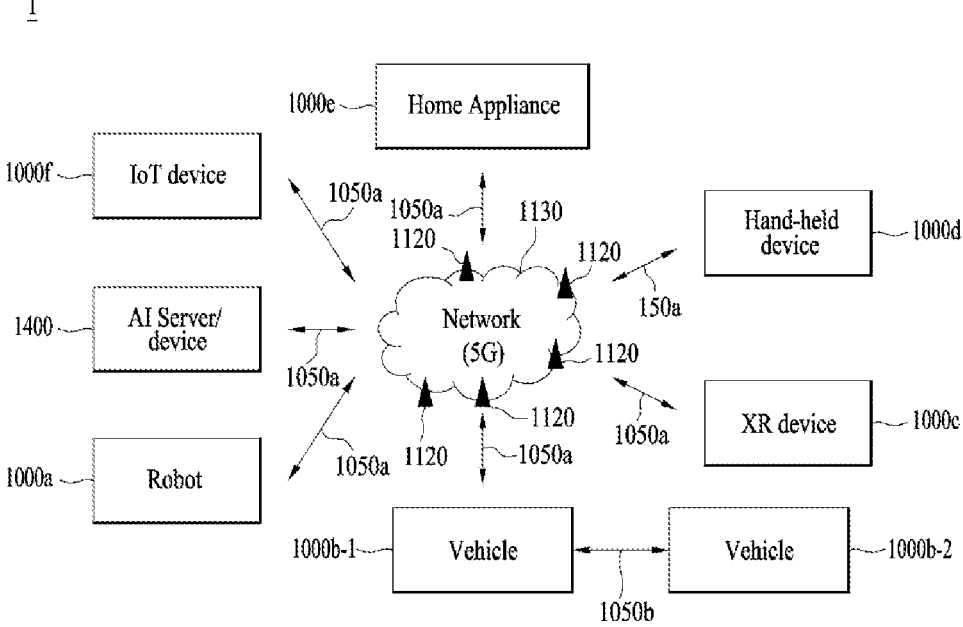

FIG. 17 illustrates a communication system 1 applied to the present disclosure. Referring to FIG. 17, a communication system 1 applied to the present disclosure includes wireless devices, BSs, and a network. Herein, the wireless devices represent devices performing communication using RAT (e.g., 5G NR or LTE) and can be referred to as communication/radio/5G devices. The wireless devices can include, without being limited to, a robot 1000a, vehicles 1000b-1 and 1000b-2, an extended reality (XR) device 1000c, a hand-held device 1000d, a home appliance 1000e, an Internet of things (IoT) device 1000f, and an artificial intelligence (AI) device/server 1400. For example, the vehicles can include a vehicle having a wireless communication function, an autonomous driving vehicle, and a vehicle capable of performing communication between vehicles. Herein, the vehicles can include an unmanned aerial vehicle (UAV) (e.g., a drone). The XR device can include an augmented reality (AR)/virtual reality (VR)/mixed reality (MR) device and can be implemented in the form of a head-mounted device (HMD), a head-up display (HUD) mounted in a vehicle, a television, a smartphone, a computer, a wearable device, a home appliance device, a digital signage, a vehicle, a robot, etc.

The hand-held device can include a smartphone, a smartpad, a wearable device (e.g., a smartwatch or a smartglasses), and a computer (e.g., a notebook). The home appliance can include a TV, a refrigerator, and a washing machine. The IoT device can include a sensor and a smartmeter. For example, the BSs and the network can be implemented as wireless devices and a specific wireless device 1120 can operate as a BS/network node with respect to other wireless devices.

The wireless devices 1000a to 1000f can be connected to the network 1130 via the BSs 1120. An AI technology can be applied to the wireless devices 1000a to 1000f and the wireless devices 1000a to 1000f can be connected to the AI server 1400 via the network 1130. The network 1130 can be configured using a 3G network, a 4G (e.g., LTE) network, or a 5G (e.g., NR) network. Although the wireless devices 1000a to 1000f can communicate with each other through the BSs 1120/network 1130, the wireless devices 1000a to 1000f can perform direct communication (e.g., sidelink communication) with each other without passing through the BSs/network. For example, the vehicles 1000b-1 and 1000b-2 can perform direct communication (e.g. V2V/V2X communication). The IoT device (e.g., a sensor) can perform direct communication with other IoT devices (e.g., sensors) or other wireless devices 1000a to 1000f.

Wireless communication/connections 1050a, 1050b, or 1050c can be established between the wireless devices 1000a to 1000f/BS 1120, or BS 1120/BS 1120. Herein, the wireless communication/connections can be established through various RATs (e.g., 5G NR) such as UL/DL communication 1050a, sidelink communication 1050b (or, D2D communication), or inter BS communication (e.g. relay, integrated access backhaul (IAB)). The wireless devices and the BSs/the wireless devices can transmit/receive radio signals to/from each other through the wireless communication/connections 1050a and 1050b. For example, the wireless communication/connections 1050a and 1050b can transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, can be performed based on the various proposals of the present disclosure.

Figure 18:
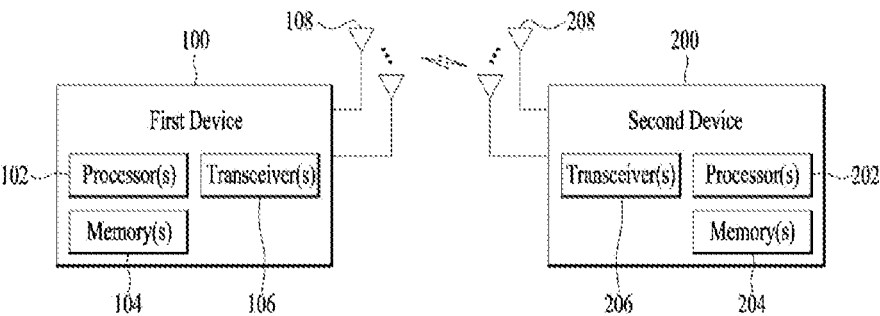

Examples of wireless devices applicable to the present disclosure. FIG. 18 illustrates wireless devices applicable to the present disclosure. Referring to FIG. 18, a first wireless device 100 and a second wireless device 200 may transmit radio signals through a variety of RATs (e.g., LTE and NR). Herein, {the first wireless device 100 and the second wireless device 200} can correspond to {the wireless device 100x and the BS 1120} and/or {the wireless device 100x and the wireless device 100x} of FIG. 17.

The first wireless device 100 can include one or more processors 102 and one or more memories 104 and additionally further include one or more transceivers 106 and/or one or more antennas 108. The processor(s) 102 can control the memory(s) 104 and/or the transceiver(s) 106 and can be configured to implement the descriptions, functions, procedures, proposals, methods, and/or operational flowcharts disclosed in this document. For example, the processor(s) 102 can process information within the memory(s) 104 to generate first information/signals and then transmit radio signals including the first information/signals through the transceiver(s) 106.

The processor(s) 102 can receive radio signals including second information/signals through the transceiver 106 and then store information obtained by processing the second information/signals in the memory(s) 104. The memory(s) 104 can be connected to the processor(s) 102 and can store a variety of information related to operations of the processor(s) 102. For example, the memory(s) 104 can store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 can be a part of a communication modem/circuit/chip designed to implement RAT (e.g., LTE or NR). The transceiver(s) 106 can be connected to the processor(s) 102 and transmit and/or receive radio signals through one or more antennas 108. Each of the transceiver(s) 106 can include a transmitter and/or a receiver. The transceiver(s) 106 can be interchangeably used with Radio Frequency (RF)

unit(s). In the present disclosure, the wireless device can represent a communication modem/circuit/chip.

The second wireless device 200 can include one or more processors 202 and one or more memories 204 and additionally further include one or more transceivers 206 and/or one or more antennas 208. The processor(s) 202 can control the memory(s) 204 and/or the transceiver(s) 206 and can be configured to implement the descriptions, functions, procedures, proposals, methods, and/or operational flowcharts disclosed in this document. For example, the processor(s) 202 can process information within the memory(s) 204 to generate third information/signals and then transmit radio signals including the third information/signals through the transceiver(s) 206.

The processor(s) 202 can receive radio signals including fourth information/signals through the transceiver(s) 206 and then store information obtained by processing the fourth information/signals in the memory(s) 204. The memory(s) 204 can be connected to the processor(s) 202 and can store a variety of information related to operations of the processor(s) 202. For example, the memory(s) 204 can store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 can be a part of a communication modem/circuit/chip designed to implement RAT (e.g., LTE or NR). The transceiver(s) 206 can be connected to the processor(s) 202 and transmit and/or receive radio signals through one or more antennas 208. Each of the transceiver(s) 206 can include a transmitter and/or a receiver. The transceiver(s) 206 can be interchangeably used with RF unit(s). In the present disclosure, the wireless device can represent a communication modem/circuit/chip.

Hereinafter, hardware elements of the wireless devices 100 and 200 will be described more specifically. One or more protocol layers can be implemented by, without being limited to, one or more processors 102 and 202. For example, the one or more processors 102 and 202 can implement one or more layers (e.g., functional layers such as PHY, MAC, RLC, PDCP, RRC, and SDAP). The one or more processors 102 and 202 can generate one or more Protocol Data Units (PDUs) and/or one or more service data unit (SDUs) according to the descriptions, functions, procedures, proposals, methods, and/or operational flowcharts disclosed in this document.

The one or more processors 102 and 202 can generate messages, control information, data, or information according to the descriptions, functions, procedures, proposals, methods, and/or operational flowcharts disclosed in this document. The one or more processors 102 and 202 can generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 can receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 can be referred to as controllers, microcontrollers, microprocessors, or microcomputers. The one or more processors 102 and 202 can be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) can be included in the one or more processors 102 and 202. The descriptions, functions, procedures, proposals, methods, and/or operational flowcharts disclosed in this document can be implemented using firmware or software and the firmware or software can be configured to include the modules, procedures, or functions. Firmware or software configured to perform the descriptions, functions, procedures, proposals, methods, and/or operational flowcharts disclosed in this document can be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document can be implemented using firmware or software in the form of code, commands, and/or a set of commands.

The one or more memories 104 and 204 can be connected to the one or more processors 102 and 202 and store various types of data, signals, messages, information, programs, code, instructions, and/or commands. The one or more memories 104 and 204 can be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 can be located at the interior and/or exterior of the one or more processors 102 and 202. The one or more memories 104 and 204 can be connected to the one or more processors 102 and 202 through various technologies such as wired or wireless connection.

The one or more transceivers 106 and 206 can transmit user data, control information, and/or radio signals/channels, mentioned in the methods and/or operational flowcharts of this document, to one or more other devices. The one or more transceivers 106 and 206 can receive user data, control information, and/or radio signals/channels, mentioned in the descriptions, functions, procedures, proposals, methods, and/or operational flowcharts disclosed in this document, from one or more other devices. For example, the one or more transceivers 106 and 206 can be connected to the one or more processors 102 and 202 and transmit and receive radio signals. For example, the one or more processors 102 and 202 can perform control so that the one or more transceivers 106 and 206 can transmit user data, control information, or radio signals to one or more other devices. The one or more processors 102 and 202 can perform control so that the one or more transceivers 106 and 206 can receive user data, control information, or radio signals from one or more other devices. The one or more transceivers 106 and 206 can be connected to the one or more antennas 108 and 208 and the one or more transceivers 106 and 206 can be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas can be a plurality of physical antennas or a plurality of logical antennas (e.g., antenna ports).

The one or more transceivers 106 and 206 can convert received radio signals/channels etc. from RF band signals into baseband signals in order to process received user data, control information, radio signals/channels, etc. using the one or more processors 102 and 202. The one or more transceivers 106 and 206 can convert the user data, control information, radio signals/channels, etc. processed using the one or more processors 102 and 202 from the base band signals into the RF band signals. To this end, the one or more transceivers 106 and 206 can include (analog) oscillators and/or filters.

Figure 19:
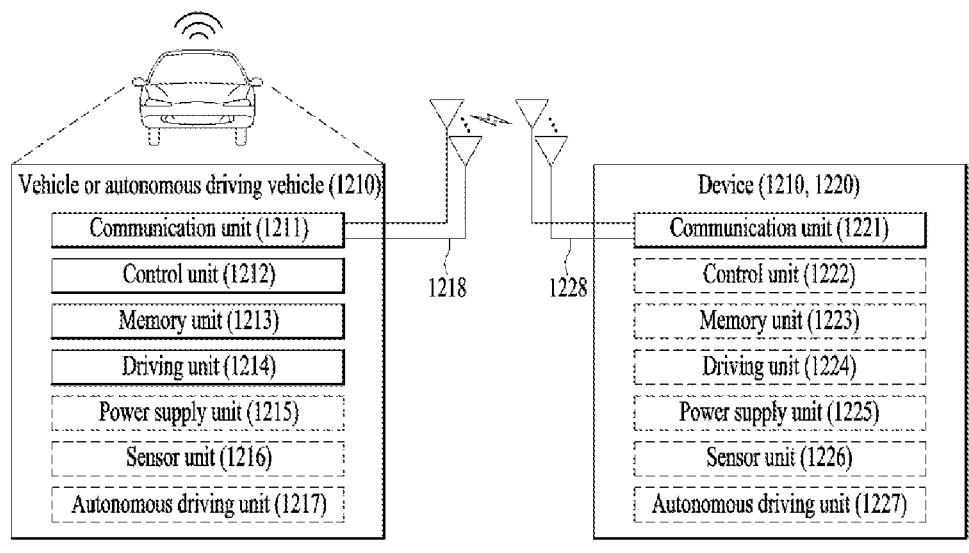

Examples of a vehicle or an autonomous driving vehicle applicable to the present disclosure. In particular, FIG. 19 illustrates a vehicle or an autonomous driving vehicle applied to the present disclosure. The vehicle or autonomous driving vehicle can be implemented by a mobile robot, a car, a train, a manned/unmanned aerial vehicle (AV), a ship, etc.

Referring to FIG. 19, a vehicle or autonomous driving vehicle 1210 can include an antenna unit 1218, a communication unit 1211, a control unit 1212, a memory unit 1213, a driving unit 1214, a power supply unit 1215, a sensor unit 1216, and an autonomous driving unit 1217. The antenna unit 1218 can be configured as a part of the communication unit 1211.

The communication unit 1211 can transmit and receive signals (e.g., data and control signals) to and from external devices such as other vehicles, BSs (e.g., gNBs and road side units), and servers. The control unit 1212 can perform various operations by controlling elements of the vehicle or the autonomous driving vehicle 1210. The control unit 1212 can include an ECU. The driving unit 1214 can cause the vehicle or the autonomous driving vehicle 1210 to drive on a road.

The driving unit 1214 can include an engine, a motor, a powertrain, a wheel, a brake, a steering device, etc. The power supply unit 1215 can supply power to the vehicle or the autonomous driving vehicle 1210 and include a wired/wireless charging circuit, a battery, etc. The sensor unit 1216 can acquire a vehicle state, ambient environment information, user information, etc. The sensor unit 1216 can include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 1217 can implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 1211 can receive map data, traffic information data, etc. from an external server. The autonomous driving unit 1217 can generate an autonomous driving path and a driving plan from the obtained data. The control unit 1212 can control the driving unit 1214 such that the vehicle or the autonomous driving vehicle 1210 can move along the autonomous driving path according to the driving plan (e.g., speed/direction control).

In the middle of autonomous driving, the communication unit 1211 can aperiodically/periodically acquire recent traffic information data from the external server and acquire surrounding traffic information data from neighboring vehicles. In the middle of autonomous driving, the sensor unit 1216 can obtain a vehicle state and/or surrounding environment information. The autonomous driving unit 1214 can update the autonomous driving path and the driving plan based on the newly obtained data/information. The communication unit 1211 can transfer information about a vehicle position, the autonomous driving path, and/or the driving plan to the external server. The external server can predict traffic information data using AI technology, etc., based on the information collected from vehicles or autonomous driving vehicles and provide the predicted traffic information data to the vehicles or the autonomous driving vehicles.

For example, FIG. 19 illustrates a neighboring vehicle 1210 or device 1220. As shown, the neighboring vehicle 1210 or device 1220 also includes an antenna unit 1228, a communication unit 1221, a control unit 1222, a memory unit 1223, a driving unit 1224, a power supply unit 1225, a sensor unit 1226, and an autonomous driving unit 1227. The antenna unit 1228 can be configured as a part of the communication unit 1221.

Examples of a vehicle and AR/VR applicable to the present disclosure. In particular, FIG. 20 illustrates a vehicle applied to the present disclosure. The vehicle can be implemented as a transport means, an aerial vehicle, a ship, etc. Referring to FIG. 20, a vehicle 1310 can include a communication unit 1311, a control unit 1312, a memory unit 1313, an I/O unit 1314, and a positioning unit 1315.

The communication unit 1311 can transmit and receive signals (e.g., data and control signals) to and from external devices such as other vehicles or BSs. The control unit 1312 can perform various operations by controlling constituent elements of the vehicle 1310. The memory unit 1313 can store data/parameters/programs/code/commands for supporting various functions of the vehicle 1310.

The I/O unit 1314 can output an AR/VR object based on information within the memory unit 1313. The I/O unit 1314 can include an HUD. The positioning unit 1315 can acquire information about the position of the vehicle 1310. The position information can include information about an absolute position of the vehicle 1310, information about the position of the vehicle 1310 within a traveling lane, acceleration information, and information about the position of the vehicle 1310 from a neighboring vehicle. The positioning unit 1315 can include a GPS and various sensors.

As an example, the communication unit 1311 of the vehicle 1310 can receive map information and traffic information from an external server and store the received information in the memory unit 1313. The positioning unit 1315 can obtain the vehicle position information through the GPS and various sensors and store the obtained information in the memory unit 1313. The control unit 1312 can generate a virtual object based on the map information, traffic information, and vehicle position information and the I/O unit 1314 can display the generated virtual object 1410 in a window 1420 in the vehicle. The control unit 1312 can determine whether the vehicle 1310 normally drives within a traveling lane, based on the vehicle position information. If the vehicle 1310 abnormally exits from the traveling lane, the control unit 1312 can display a warning on the window in the vehicle through the I/O unit 1314. In addition, the control unit 1312 can broadcast a warning message regarding driving abnormality to neighboring vehicles through the communication unit 1311. According to situation, the control unit 1312 can transmit the vehicle position information and the information about driving/vehicle abnormality to related organizations.

The above-described embodiments of the present disclosure are applicable to various mobile communication systems.

According to an embodiment, positioning accuracy of a UE can be improved by using a UWB as well. In addition, by applying an SSR delegator, data usage and power consumption of the UE can be reduced by reducing the amount of SSR correction information transmitted to the UE.

What is claimed is:

1. A first user equipment (UE) comprising:
a transmitter configured to transmit a first safety message including a first Ultra-WideBand (UWB) token ID of the first UE for connecting to an UWB session;
a receiver configured to receive a second safety message transmitted by a second UE in an anchor mode, the second safety message including a second UWB token ID of the second UE for connecting to the UWB session; and
a controller configured to:
set the first UE into a tag mode based on a positioning accuracy of the first UE being greater than a preset value, and set the second UE into an anchor mode based on a positioning accuracy of the second UE being less than the preset value,
initiate the Ultra-WideBand (UWB) session with the second UE having the second UWB token ID,
perform Time of Flight (ToF) or angle of arrival (AoA)-based measurement based on the second UE in the anchor mode, and
update a location of the first UE based on the ToF or AoA-based measurement,
wherein the first UE maintains the tag mode based on the positioning accuracy of the first UE being greater than a preset value, and determine whether to maintain the UWB session by evaluating a degree of risk with a remote UE based on the positioning accuracy of the first UE being less than the preset value, and
wherein the second UE maintains the anchor mode based on the positioning accuracy of the second UE being less than the preset value, and determines whether to maintain the UWB session by evaluating a degree of risk with a remote UE based on the positioning accuracy of the second UE being greater than the preset value.

2. The first UE of claim 1, wherein the receiver is further configured to receive a final location information calculated by the second UE from UWB-based measurement and Global Navigation Satellite System (GNSS)-based measurement.

3. The first UE of claim 2, wherein the final location information is determined through loosely coupled integration based on a Kalman filter from the UWB-based measurement and the GNSS-based measurement.

4. The first UE of claim 2, wherein the final location information is determined by integrating a UWB measurement value when calculating a position using a GNSS measurement value.

5. The first UE of claim 1, wherein the first safety message comprises one of a first Personal Safety Message (PSM) or a first Basic Safety Message (BSM), and
wherein the second safety message comprises one of a second PSM or a second BSM.

6. The first UE of claim 5, wherein the first PSM, the second PSM, the first BSM, and the second BSM are related to a UWB discovery procedure.

7. The first UE of claim 1, wherein the UWB token ID is included in SupplementalExtensions of the first safety message and the second safety message.

8. The first UE of claim 1, wherein the second UE in the anchor mode receives state space representation (SSR) correction information from a state space representation (SSR) delegator.

9. The first UE of claim 8, wherein the SSR delegator broadcasts updated state space representation (SSR) correction information to all UEs in each grid when SSR correction information is changed.

10. The first UE of claim 1, wherein the controller is further configured to:
switch the first UE in the tag mode to an anchor mode based on absence of risk of collision with the remote UE.

11. The first UE of claim 1, wherein the second UE in the anchor mode switches to a tag mode based on absence of risk of collision with the remote UE.

12. A method of controlling a first user equipment (UE), the method comprising:
transmitting, via a transmitter included in the first UE, a first safety message including a first Ultra-WideBand (UWB) token ID of the first UE for connecting to an UWB session;
receiving, via a receiver included in the first UE, a second safety message transmitted by a second UE in an anchor mode, the second safety message including a second UWB token ID of the second UE for connecting to the UWB session;
setting, via a controller included in the first UE, the first UE into a tag mode based on a positioning accuracy of the first UE being greater than a preset value, and setting the second UE into an anchor mode based on a positioning accuracy of the second UE being less than the preset value;
initiating, via the controller, the Ultra-WideBand (UWB) session with the second UE having the second UWB token ID;
performing, via the controller, a Time of Flight (ToF) or angle of arrival (AoA)-based measurement based on the second UE in the anchor mode; and
updating, via the controller, a location of the first UE based on the ToF or AoA-based measurement,
wherein the first UE maintains the tag mode based on the positioning accuracy of the first UE being greater than a preset value, and determine whether to maintain the UWB session by evaluating a degree of risk with a remote UE based on the positioning accuracy of the first UE being less than the preset value, and
wherein the second UE maintains the anchor mode based on the positioning accuracy of the second UE being less than the preset value, and determines whether to maintain the UWB session by evaluating a degree of risk with a remote UE based on the positioning accuracy of the second UE being greater than the preset value.

13. The method of claim 12, further comprising:
receiving, via the receiver, a final location information calculated by the second UE from UWB-based measurement and Global Navigation Satellite System (GNSS)-based measurement.

14. The method of claim 13, wherein the final location information is determined through loosely coupled integration based on a Kalman filter from the UWB-based measurement and the GNSS-based measurement.

15. The method of claim 13, wherein the final location information is determined by integrating a UWB measurement value when calculating a position using a GNSS measurement value.

16. The method of claim 12, wherein the first safety message comprises one of a first Personal Safety Message (PSM) or a first Basic Safety Message (BSM), and wherein the second safety message comprises one of a second PSM or a second BSM.

17. The method of claim 16, wherein the first PSM, the second PSM, the first BSM, and the second BSM are related to a UWB discovery procedure.

18. The method of claim 12, wherein the UWB token ID is included in SupplementalExtensions of the first safety message and the second safety message, wherein the second UE in the anchor mode receives state space representation (SSR) correction information from a state space representation (SSR) delegator, and wherein the SSR delegator broadcasts updated SSR correction information to all UEs in each grid when SSR correction information is changed.

\* \* \* \* \*